US012577043B2

(12) United States Patent
Entenfellner et al.

(10) Patent No.: US 12,577,043 B2
(45) Date of Patent: Mar. 17, 2026

(54) APPARATUS FOR MOVING TRANSPORT CONTAINERS BETWEEN A CONTAINER STACK AND A CONTAINER RACK

(71) Applicants: Peter Entenfellner, Thalheim bei Wels (AT); Andreas Holzleithner, Fischlham (AT)

(72) Inventors: Peter Entenfellner, Thalheim bei Wels (AT); Andreas Holzleithner, Fischlham (AT)

( * ) Notice: Subject to any disclaimer, the term of this patent is extended or adjusted under 35 U.S.C. 154(b) by 407 days.

(21) Appl. No.: 18/018,263

(22) PCT Filed: Nov. 12, 2021

(86) PCT No.: PCT/AT2021/060430
§ 371 (c)(1),
(2) Date: Jan. 26, 2023

(87) PCT Pub. No.: WO2022/126156
PCT Pub. Date: Jun. 23, 2022

(65) Prior Publication Data
US 2023/0286743 A1      Sep. 14, 2023

(30) Foreign Application Priority Data
Dec. 17, 2020    (AT) ................................ A 51111/2020

(51) Int. Cl.
    *B65G 1/04*          (2006.01)
(52) U.S. Cl.
    CPC ...... *B65G 1/0435* (2013.01); *B65G 2201/025* (2013.01)
(58) Field of Classification Search
    CPC ....... B65G 1/0435; B65G 61/00; B65G 47/90
    See application file for complete search history.

(56) References Cited

U.S. PATENT DOCUMENTS

| | | | | |
|---|---|---|---|---|
| 5,975,837 | A | * | 11/1999 | Focke .................... B65G 47/90 |
| | | | | 414/792.9 |
| 6,234,745 | B1 | * | 5/2001 | Pugh ...................... B65G 59/02 |
| | | | | 414/796.9 |

(Continued)

FOREIGN PATENT DOCUMENTS

| | | |
|---|---|---|
| EP | 2620391 A1 | 7/2013 |
| EP | 3647231 A1 | 5/2020 |

(Continued)

OTHER PUBLICATIONS

Espacenet English language abstract for FR 2948648 A1, Feb. 4, 2011.

(Continued)

*Primary Examiner* — Kaitlin S Joerger
(74) *Attorney, Agent, or Firm* — Tiajoloff & Kelly LLP

(57)          ABSTRACT

An apparatus for moving transport containers (1) between a container stack (4) and a container rack (22) comprises a lifting device (2) that can be adjusted to a transport container (1) transversely to a lifting direction (H). For the apparatus to have a compact structure and reliably moves transport containers between a container stack and a container rack, irrespective of the fill level of said rack, and to be preferably suitable for manipulators of industrial robots, the lifting device (2) comprises a guide for moving the transport container (1) transversely to the lifting direction (H), and a sliding device (3), which is detachably translationally rigidly connectable to the transport container (1), is provided for moving the transport container (1) in the guide (19) between a lifting position and a position for being introduced into the rack.

12 Claims, 8 Drawing Sheets

(56) References Cited

U.S. PATENT DOCUMENTS

Figure 1:
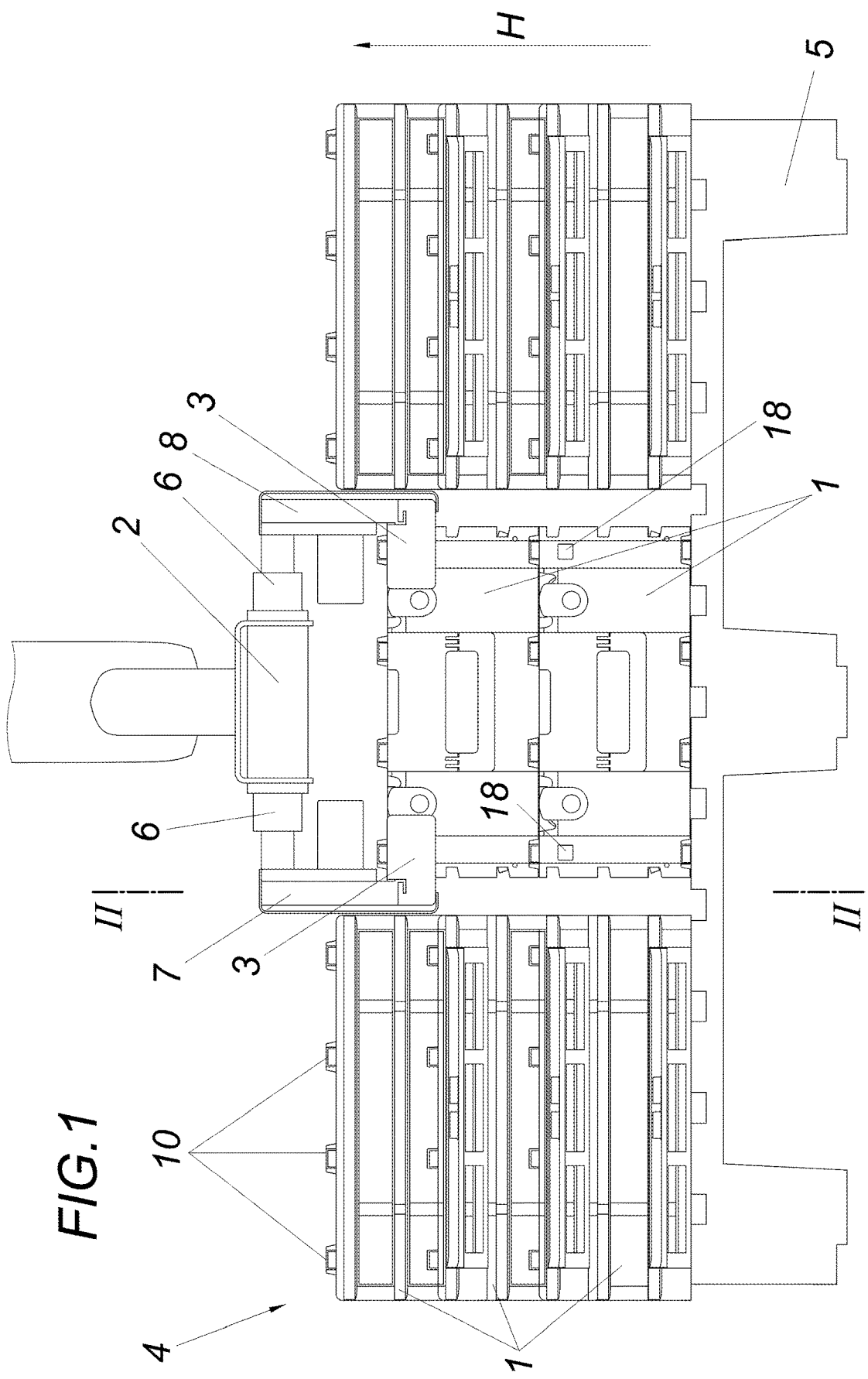

| | | | |
|---|---|---|---|
| 9,296,569 B2 | 3/2016 | Hellenbrand et al. | |
| 9,771,216 B2 | 9/2017 | Hellenbrand et al. | |
| 10,300,610 B1 | 5/2019 | La Rovere et al. | |
| 2014/0377050 A1 | 12/2014 | Hellenbrand et al. | |
| 2016/0176634 A1 | 6/2016 | Hellenbrand et al. | |
| 2017/0267469 A1* | 9/2017 | Miyoshi ................. | B65G 43/00 |
| 2020/0165082 A1* | 5/2020 | Ueda ................... | B65G 59/063 |
| 2020/0180878 A1* | 6/2020 | Ochiishi ............... | B65G 59/10 |
| 2020/0231420 A1* | 7/2020 | Ueda ................... | B65G 1/0414 |

FOREIGN PATENT DOCUMENTS

| | | | |
|---|---|---|---|
| FR | 2948648 A1 | 2/2011 | |
| JP | S59-223605 A | 12/1984 | |
| WO | 2019/152861 A1 | 8/2019 | |
| WO | 2020/067907 A1 | 4/2020 | |

OTHER PUBLICATIONS

Espacenet English language abstract for JP S59-223605 A, Dec. 15, 1984.

* cited by examiner

APPARATUS FOR MOVING TRANSPORT CONTAINERS BETWEEN A CONTAINER STACK AND A CONTAINER RACK

FIELD OF THE INVENTION

The invention relates to an apparatus for moving transport containers between a container stack and a container rack, having a lifting device which can be set against a transport container transversely to a lifting direction.

DESCRIPTION OF THE PRIOR ART

In the field of transport logistics, apparatuses designed as so-called manipulators are used in particular. These allow individual transport containers to be placed and picked up. Such apparatuses usually comprise lifting devices which, when picking up a transport container, approach it from the top in a lifting direction, wherein the lifting device, which is designed, for example, as a gripper system, is set against the transport container transversely to the lifting direction. The term "set against transversely to the lifting direction" refers to the fact that the active surfaces of the lifting device are not set against the container base side, but in particular against the side walls of a transport container, so that the transport container can be lifted by the lifting device in a force-fit manner in the lifting direction. However, a disadvantage of such devices is that moving transport containers from a container stack to a container rack, which is generally only accessible from one infeed side, is only possible to a limited extent because, in particular in the case of at least partially filled container racks, the gripper system or its pivot arm no longer has sufficient space to insert the transport container into the corresponding compartment of the container rack. Conversely, moving a transport container from a full container rack to a container stack is basically not possible due to the given design restrictions.

SUMMARY OF THE INVENTION

There is thus a need for an apparatus of the type described at the outset which, despite its compact design, enables transport containers to be reliably moved between a container stack and a container rack, irrespective of the degree of filling of the latter, and which is preferably suitable for equipping manipulators on industrial robots.

The invention solves the given object in that the lifting device comprises a guide for displacing the transport container transversely to the lifting direction, and in that a sliding device, which can be releasably connected to the transport container in a tension-resistant and shear-resistant manner, is provided for displacing the transport container in the guide between a lifting position and a rack insertion position.

As a result of the features of the invention, it is possible, irrespective of the degree of filling of a container rack, on the one hand to pick up the uppermost transport container from a container stack starting from the lifting direction, to transfer it in a fall-proof manner to a container rack and to push it in there with the aid of the sliding device transversely to the lifting direction, and on the other hand to remove transport containers from the container rack transversely to the lifting direction with the sliding device and, coming from the lifting direction, to load them again onto a container stack or onto transport pallets. The lifting device can be set against the transport container in such a way that it is held securely in a lifting position and preferably form-fit as well as free of force-fit by the lifting device, so that the transport container can also be moved along the guide transversely to the lifting direction. The sliding device can be detachably connected to the transport container in a tension-resistant and shear-resistant manner in such a way that, on the one hand, the transport container is secured in the lifting position even at the high accelerations of an industrial robot required for short manipulation times and, on the other hand, can effectively absorb the force application introduced by the sliding device for displacing the transport container between the lifting position and the rack insertion position. It is thus also no longer necessary for the apparatus, in particular if it also comprises a multi-axis industrial robot, to first penetrate into the interior of the container rack in order to displace the transport container into the container rack, so that the transport container can be released there from the lifting position and inserted into the container rack. According to the invention, in contrast, it is provided that the apparatus together with the transport container in the lifting position can be positioned at the insertion side of the container rack at a corresponding rack height in a transfer position, wherein the transport container is then displaced from the lifting position along the guide into the rack insertion position and thus transferred into the corresponding rack compartment.

Particularly favorable design conditions result, for example, if the guide according to the invention is formed by a slide rail on which the transport container rests and can be displaced transversely to the lifting direction between the lifting position and the rack insertion position via the sliding device. In addition, the apparatus according to the invention can be rotatable with respect to an axis of rotation extending in the lifting direction in order to be able to displace transport containers independently of the spatial position of the container stacks and the container racks relative to each other.

In order to enable reliable displacement between a container stack and a container rack in a compact design irrespective of the dimensions of the transport containers, it is proposed that the apparatus comprises a container receptacle into which the transport container can be inserted in the lifting direction when the lifting device is open, and transversely to the lifting direction when the lifting device is set. Particularly in the case of container stacks arranged closely together, a narrow gap is usually left between adjacent container stacks in order to enable a transport container to be picked up manually if necessary by reaching with the hands into the gaps on each side of the transport container. In view of this background and to enable the lifting device to pick up a transport container without difficulty, it is recommended that the lifting device only protrudes from the transport container by such a distance in relation to its width that the lifting device can be positioned in the gap spaces from the lifting direction.

A structurally advantageous solution for holding the transport container by the lifting device securely and yet displaceably transverse to the lifting direction is provided when the lifting device set against the transport container forms a spring-groove connection with the transport container extending transversely to the lifting direction. To reduce the risk of damage to the spring due to improper handling of the transport container, the transport container preferably forms guide grooves on two opposite side walls, each running transversely to the lifting direction, in which corresponding guide webs of the lifting device engage as springs so that, on the one hand, a positive connection is formed in the lifting direction and, on the other hand, displaceability of the transport container relative to the lifting device is made possible transversely to the lifting direction by sliding of the guide webs relative to the guide grooves. In principle, however, the guide grooves can also be formed by the lifting device while the springs are arranged on the transport container.

Particularly favorable lifting conditions with low installation space requirements result if the lifting device has two lifting arms that can be displaced relative to each other. For example, the lifting arms can be moved relative to each other by means of pneumatically or hydraulically actuated telescopic arms or a spindle drive that can be moved transversely to the lifting direction. Preferably, each lifting arm forms a corresponding spring-groove connection with the transport container it receives. The width of the individual lifting arms can be less than the smallest gap between two transport containers in adjacent container stacks.

In order to enable trouble-free connection and disconnection of the sliding device to the transport container while at the same time maintaining a particularly robust design, it is proposed that the sliding device has at least one slider which has a latching body adjustable between a latching position and an open position for engagement in a latching opening of the transport container. To connect the sliding device to the transport container, the latching body, which preferably comprises two effect elements, is inserted into the latching opening of the transport container in an insertion direction, whereupon the two effect elements are displaced relative to one another transversely to the insertion direction and engage behind the latching opening in a form-fitting manner and/or spread the latching body in the latching opening in a force-fitting manner. Conversely, to release the sliding device from the transport container, the effect elements of the latching body are displaced back towards each other. For particularly favorable design conditions, the latching body can have two latching body halves as effect elements that can be displaced towards or against each other. The fact that the latching body is not arranged on the transport container also has the advantage that the risk of damage to the protruding latching body due to improper handling of the transport container is reduced.

In an advantageous embodiment of the apparatus according to the invention, the slider of the sliding device can be displaced between a transfer position for connection to a transport container arranged in a container rack and a lifting position for receiving the transport container in the lifting device. For particularly good space saving, the slider is preferably displaceable from an edge region of the apparatus to an edge region opposite transversely to the lifting direction. As a result of these features, the apparatus or the mounting of the apparatus on any pivot arm is only subjected to low tilting moments when a transport container is displaced between the container rack and the lifting device, because in the course of the displacement between the transfer position and the lifting position the weight force of the transport container can be absorbed both by the lifting device and by the container rack.

In order to be able to use the apparatus according to the invention for transport containers of different widths and to create advantageous design conditions with regard to both the lifting and the sliding device, it is recommended that the sliding device comprises two sliders, each mounted on a lifting arm so as to be displaceable transversely to the lifting direction. Preferably, each lifting arm forms a structural unit together with a slider and an associated actuator. For example, a double chain drive formed by a pair of double pinions can be provided as the actuating drive, wherein a lever arm is articulated both on the respective chains and on the corresponding slider itself for the drive connection. The fact that the chains assigned to each pinion have a different running speed means that, with appropriate design and dimensioning of the double chain drive, the travel of the slider extending transversely to the direction of lift can be adjusted. Alternatively, the actuator can form a link guide, with a lever arm displaceable along the link guide being drive-connected to the slider. For a particularly compact design, it can be provided in principle that in the case of a spring-groove connection between the transport container and the lifting device, the guide webs of the lifting arms, each acting as a spring, simultaneously form the guide for the sliders for their displacement transverse to the lifting direction.

For releasable fastening between transport containers stacked one on top of the other, these can comprise latching devices which have latching hooks displaceable along an engagement direction for engagement in latching recesses of a transport container adjacent to the container stack. The relevant latching recesses can be formed, for example, on two opposite side walls of a transport container or can also be provided by guide bodies arranged on the container ceiling. After actuation of the latching device, the latching hooks engage positively in the latching recesses and thus also secure the transport containers to one another against the direction of engagement and, due to the positive locking, also in a transverse direction, so that the two adjacent transport containers are aligned and secured to one another in all spatial directions.

Against this background, it is proposed that an actuating device for a latching connection be provided to enable such transport containers to be relocated easily between a container stack and a container rack. Due to the actuating device, a latching connection formed by a previously described latching device for anchoring a transport container can be released, so that the transport container to be lifted is released for relocation. In the case of two lifting arms, a corresponding actuating device can be assigned to each of these lifting arms.

In this context, particularly favorable conditions arise in terms of design if the actuating device comprises an actuating slider which is arranged at the free end of a chain drive guided in the actuating direction. Preferably, the corresponding chain drive is accommodated in a lifting arm, so that a particularly compact design is made possible. Depending on the design of the latching connection to be released, the actuating slider can, for example, form a contact surface at its free end so that the force applied by the actuating slider to the latching device, which has, for example, a spring-loaded latching bracket, can be applied without difficulty.

BRIEF DESCRIPTION OF THE INVENTION

Figure 2:
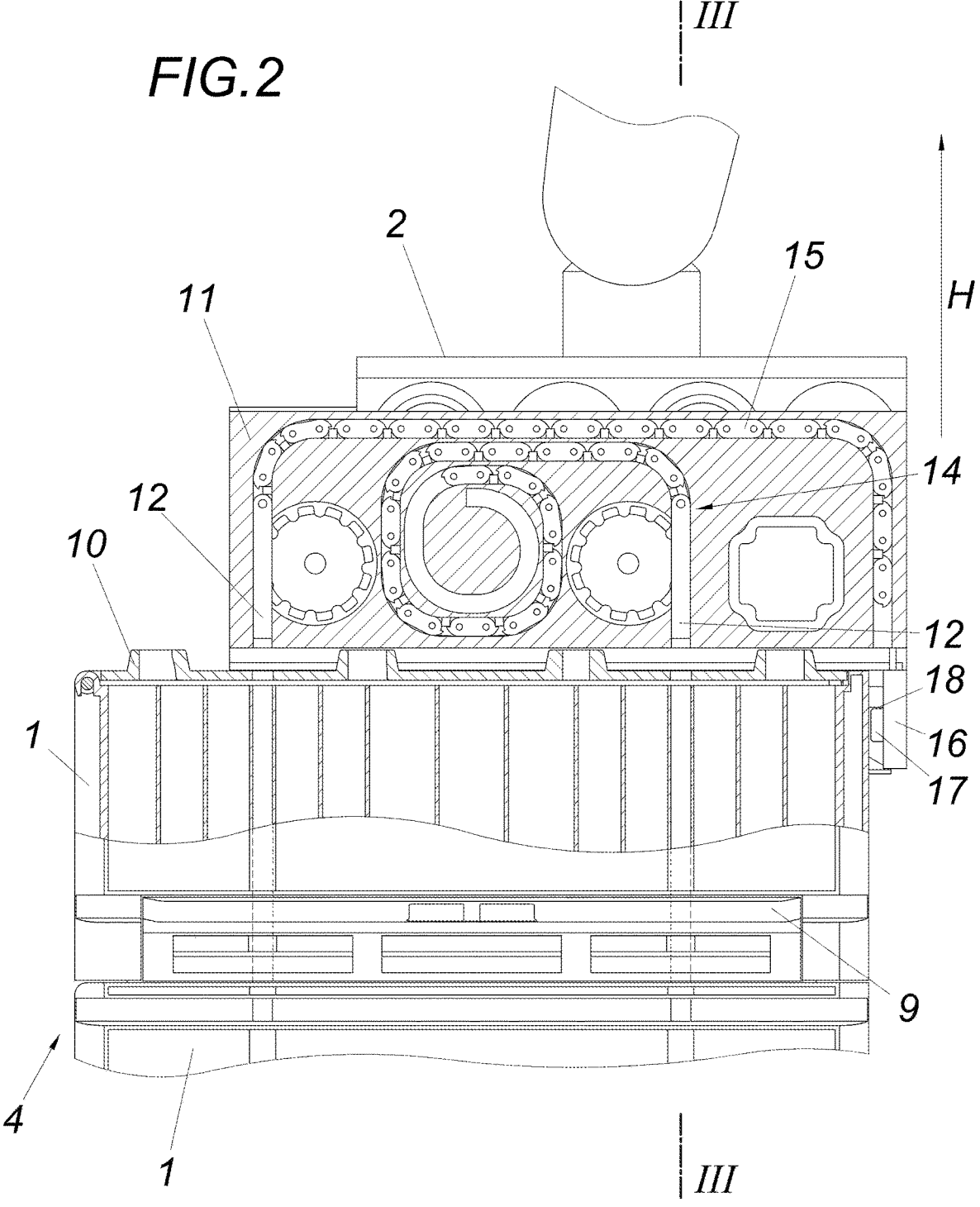
Figure 3:
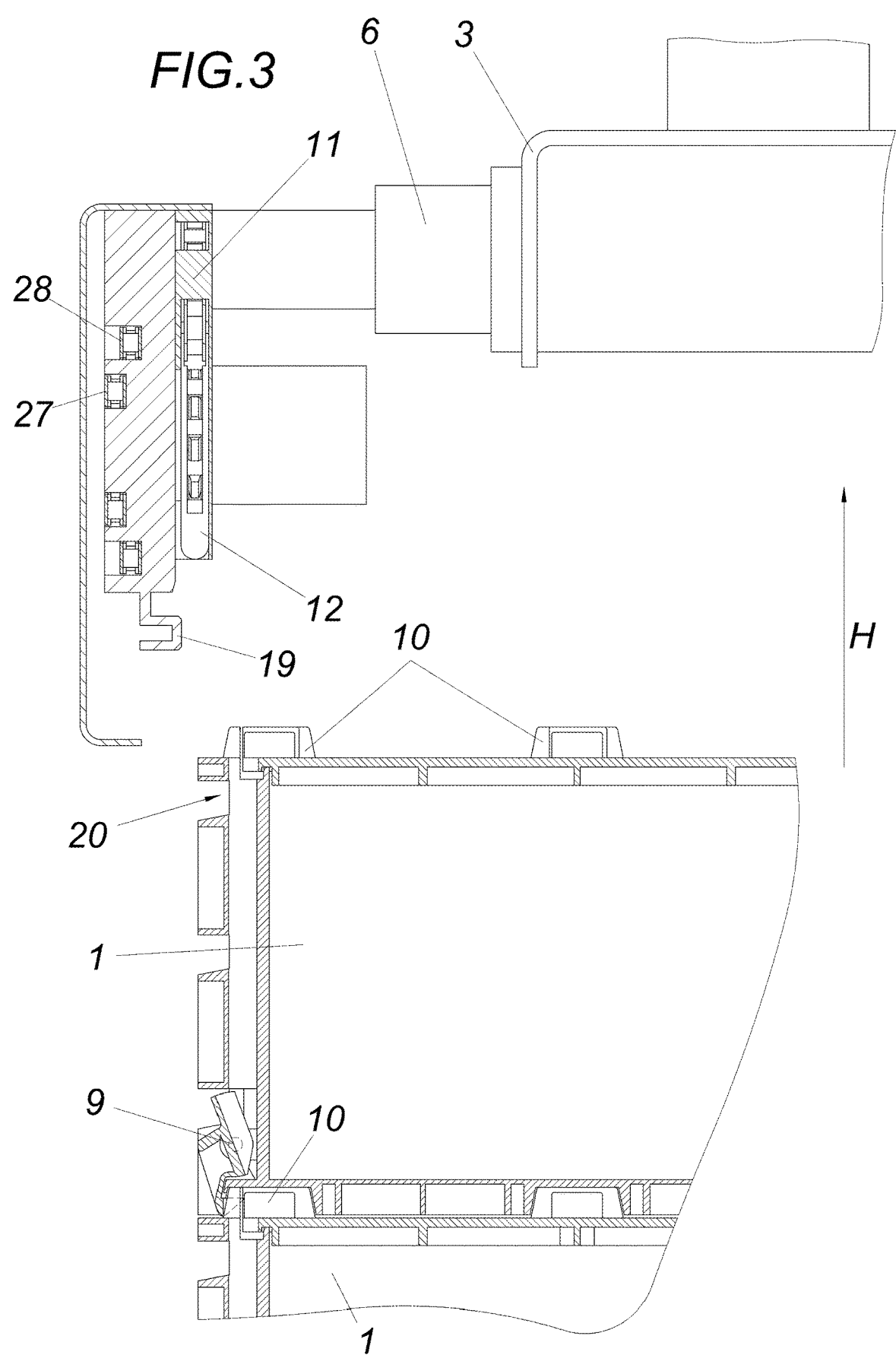
Figure 4:
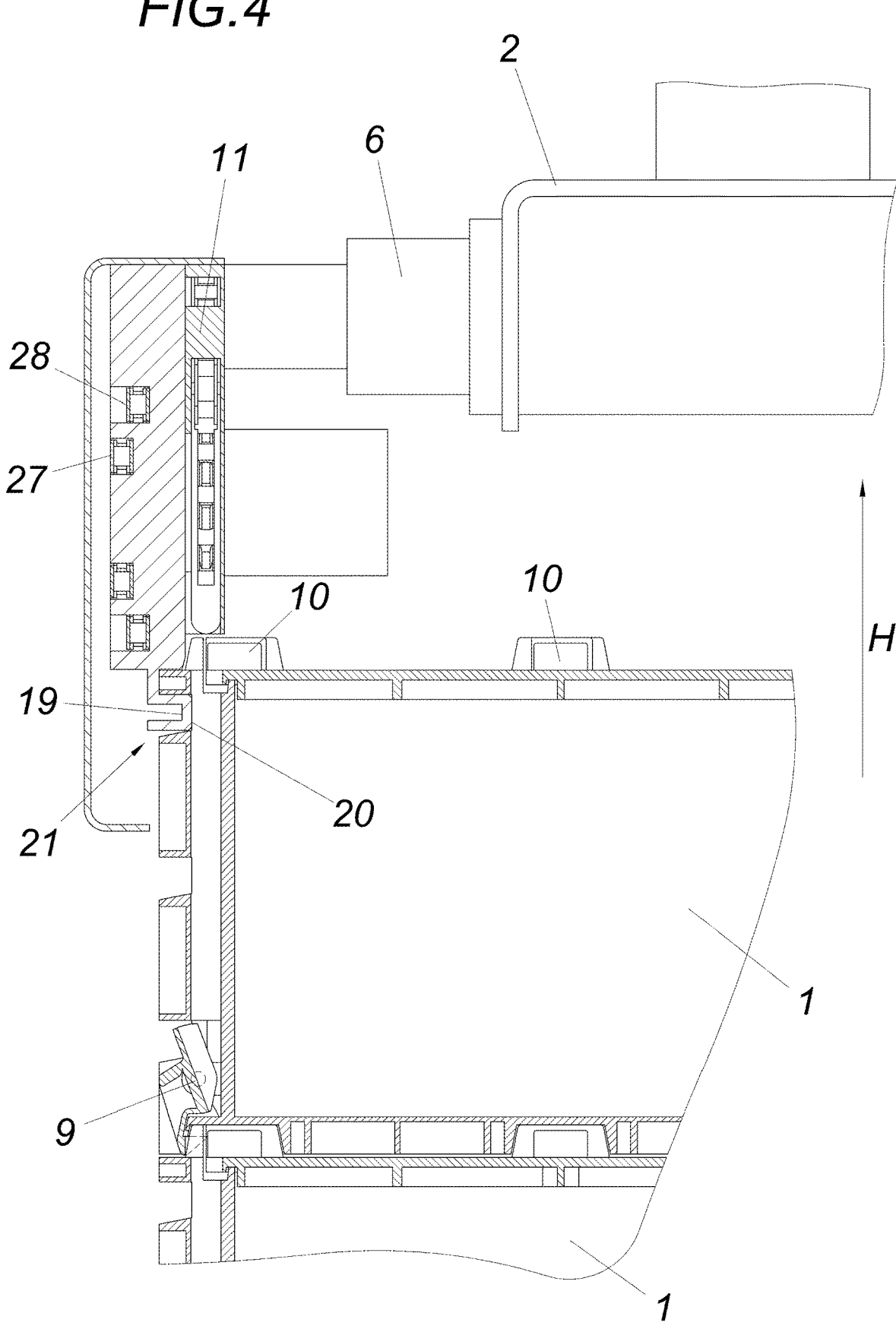
Figure 5:
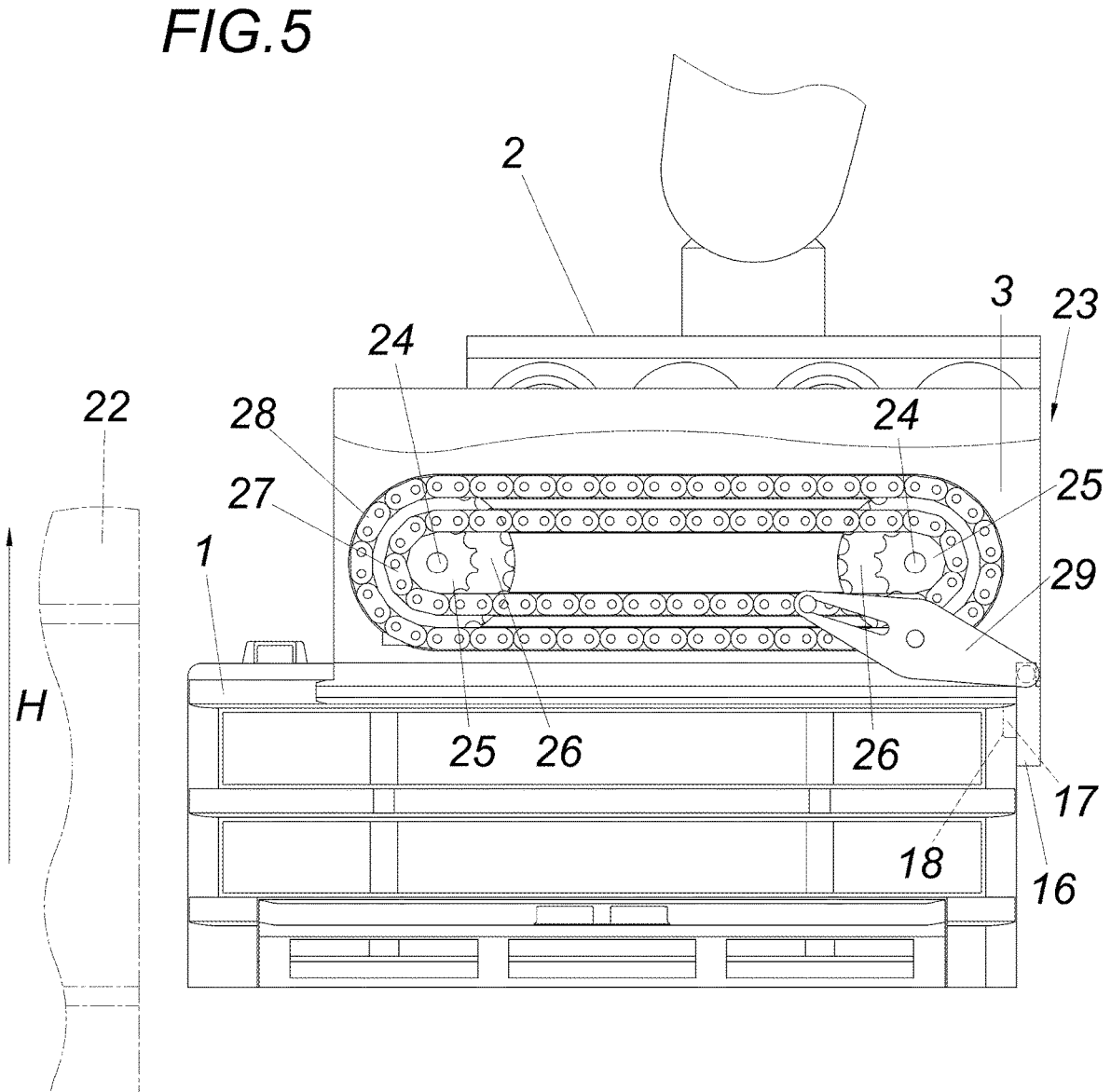
Figure 6:
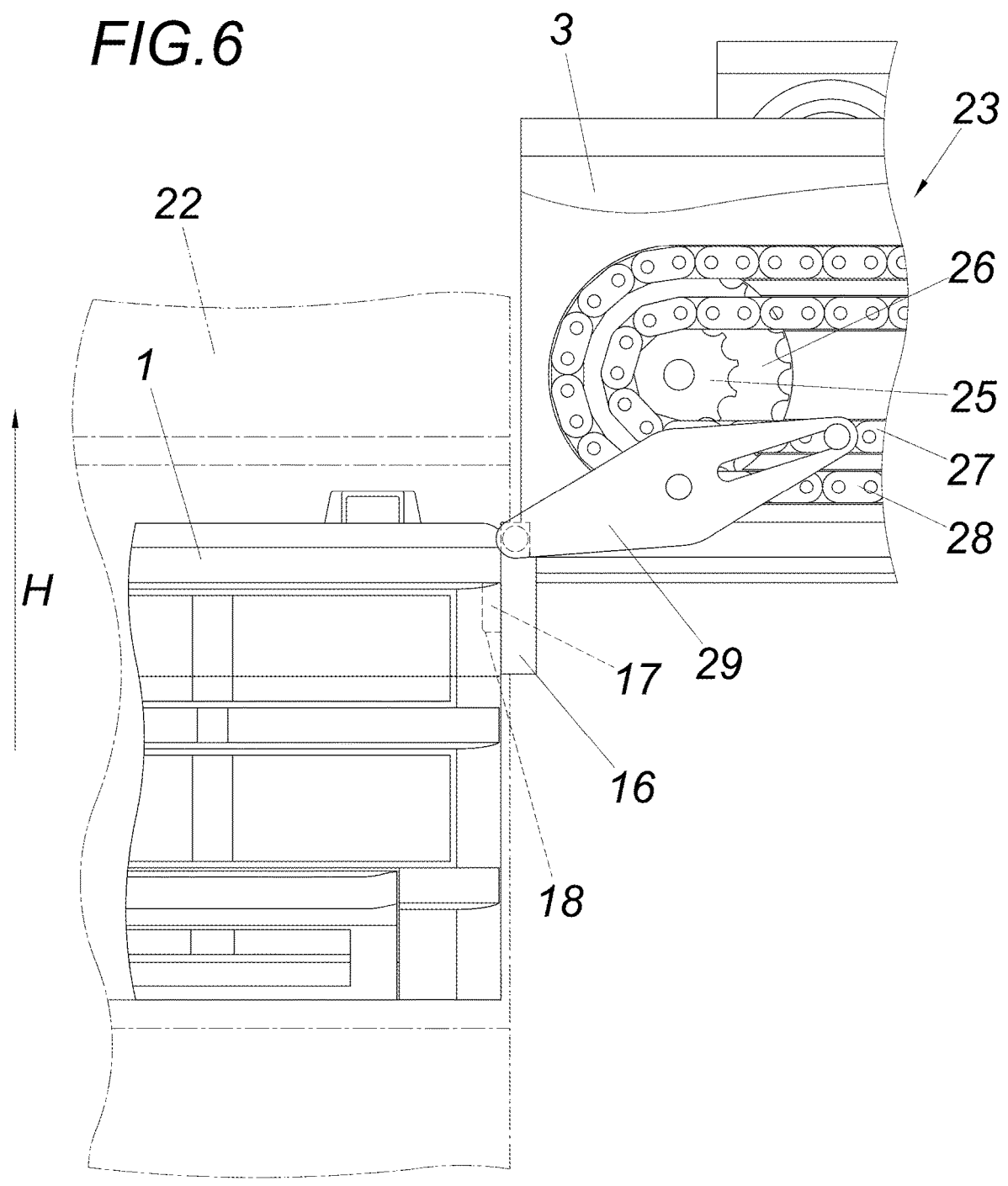
Figures 7, 8:
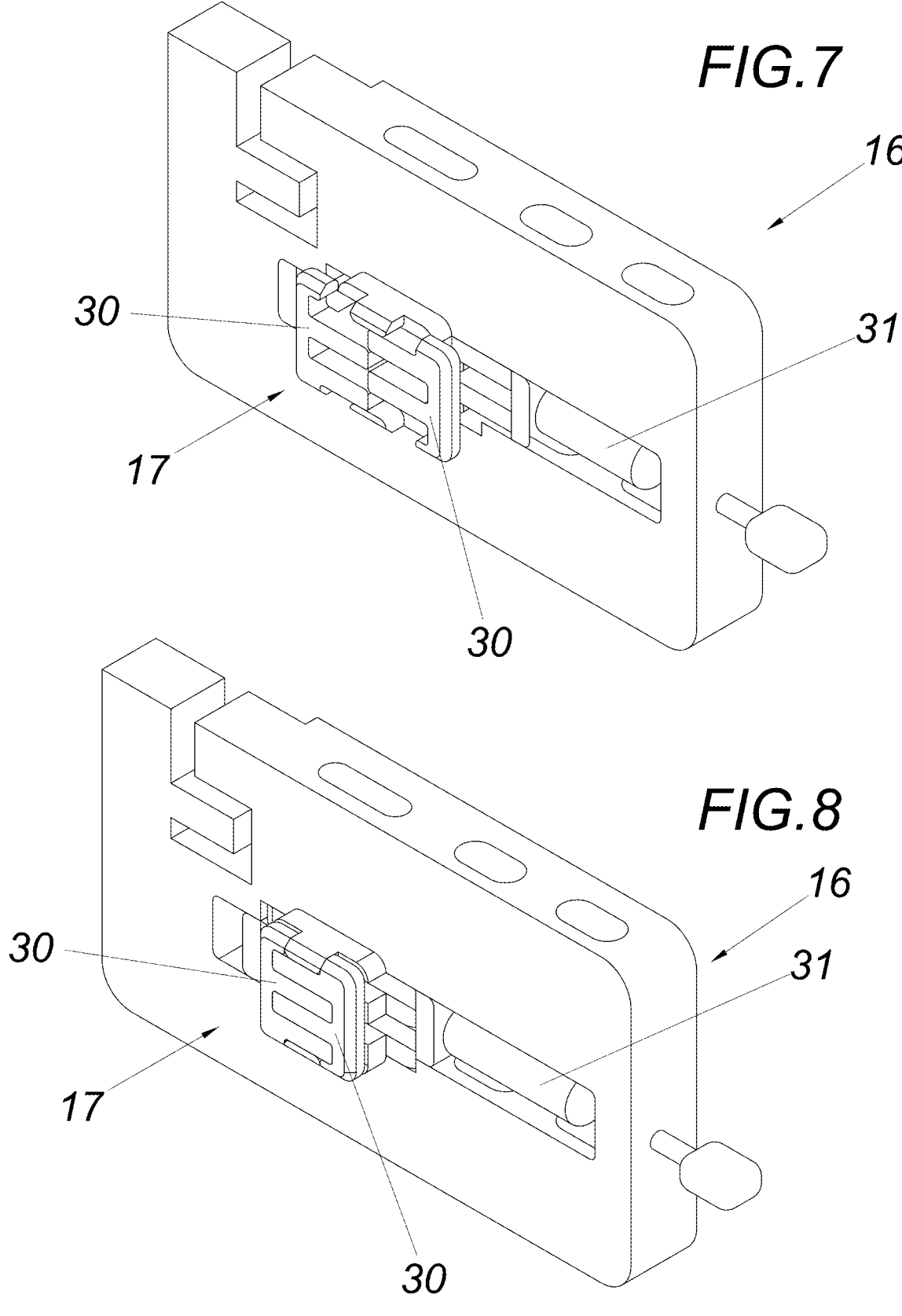
Figure 9:
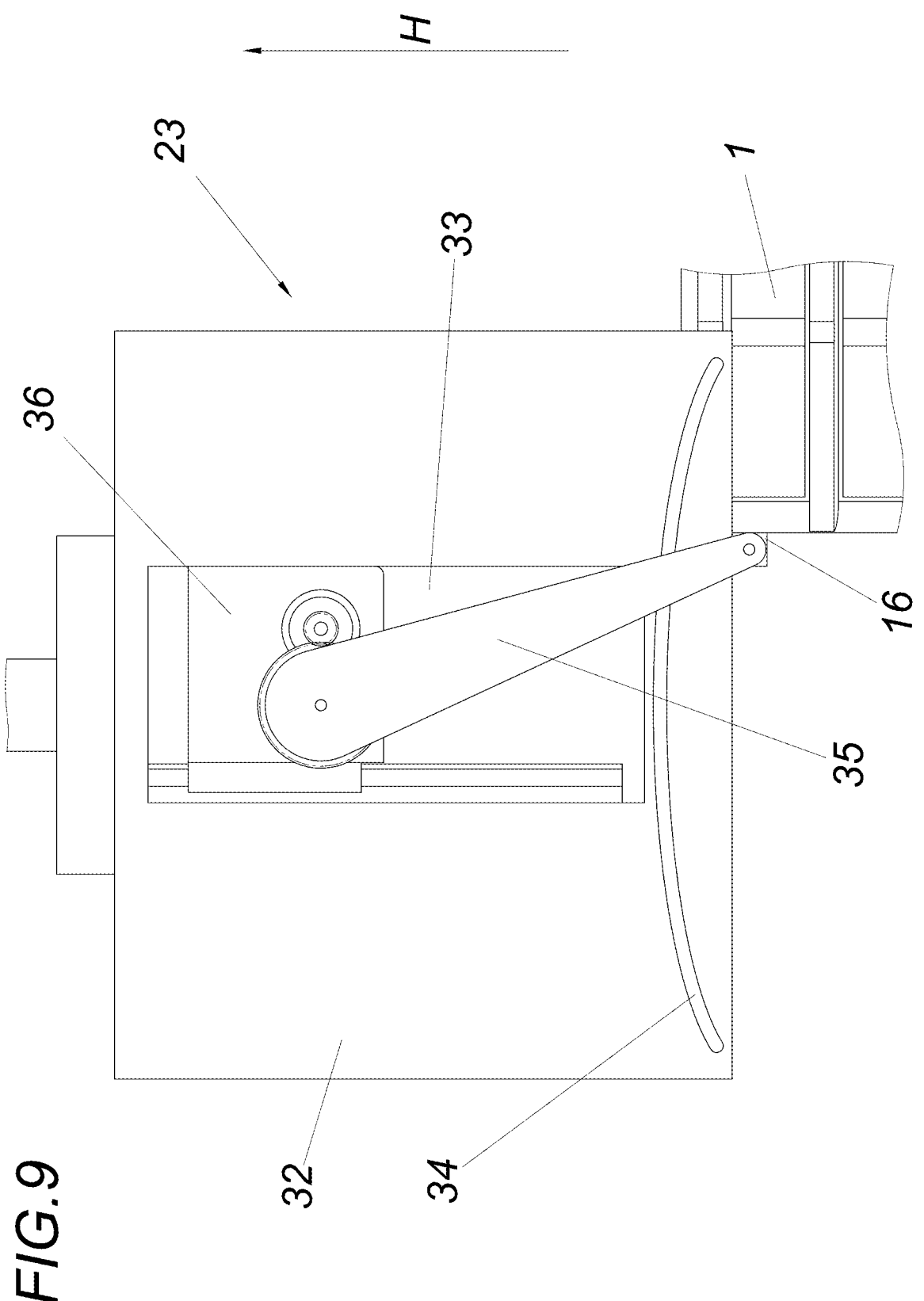

In the drawing, the subject of the invention is shown by way of example, wherein FIG. 1 shows a schematic front view of three container stacks lying next to each other with an apparatus according to the invention attached in the lifting direction with the lifting device open, FIG. 2 shows a section along line II-II, FIG. 3 shows a section along line III-III, FIG. 4 shows a representation corresponding to FIG. 3 with the set lifting device, FIG. 5 shows a partially exposed side view of an apparatus according to the invention having a sliding device in the lifting position in a first embodiment, FIG. 6 shows a detailed view corresponding to FIG. 5 with a sliding device in the transfer position, FIG. 7 shows a schematic oblique view of a slider according to the invention with a latching body in the latching position, FIG. 8 shows a representation corresponding to Fig. with a latching body in the open position, and FIG. 9 shows a schematic side view of a sliding device according to the invention in a further embodiment.

DETAILED DESCRIPTION OF THE PREFERRED EMBODIMENTS

An apparatus according to the invention comprises a lifting device 2 which can be set against a transport container 1 transversely to the lifting direction H, and a sliding device 3 which can be connected to the transport container 1 in a detachable, tension-resistant and shear-resistant manner. The transport containers 1 are arranged on adjacent container stacks 4, which in turn are placed on an exemplary pallet 5, as shown in FIG. 1. In the embodiment shown, the lifting device 2 has two lifting arms 7, 8 which can be displaced relative to one another via, for example, hydraulically actuated telescopic arms 6. In addition, the apparatus can also comprise an industrial robot, as indicated by the pivot arm on which the lifting device 2 is mounted.

To pick up a transport container 1, the lifting device 2 approaches the uppermost transport container 1 of a container stack 4 coming from the lifting direction H and is set against the transport container 1 via the lifting arms 7, 8 transverse to the lifting direction H. To enable the lifting device 2 to pick up a transport container 1 without difficulty despite the narrow gaps that form between adjacent container stacks 4, the width of the individual lifting arms 7, 8 can be less than the smallest gap between two transport containers 1 in adjacent container stacks 4.

With respect to FIGS. 2, 3 and 4, it can be recognized that the transport containers 1 stacked on top of one another in the present case have latching devices 9 for releasable fastening to one another. The latching devices 9 have, for example, latching hooks displaceable along a direction of engagement for engagement in latching recesses of a transport container 1 located below it on the same container stack 4. As in the present case, the latching recesses can be provided, for example, by guide bodies 10, each of which is arranged on the container top of a transport container 1. Therefore, in order to enable a transport container 1 to be picked up from a container stack 4 without difficulty, an apparatus according to the invention can have an actuating device 11 for releasing a latching connection formed by the latching device 9. For applying force to the latching device 9, the actuating device 11 comprises, for example, actuating sliders 12 which are arranged on free ends 13, 14 of a chain drive 15 guided in the actuating direction. For a compact design, the chain drive 15 can be accommodated in a lifting arm 7, 8. As is also indicated in FIG. 2, the sliding device 3 can have at least one slider 16, which comprises a latching body 17 for engagement in a latching opening 18 of the transport container 1 in order to form a releasably tension-resistant and shear-resistant connection.

With a view to FIGS. 3 and 4, the lifting device 2 has a guide in the form of guide webs 19 and guide grooves 20 for displacing the transport container 1 transversely to the lifting direction H. In contrast, the transport container 1 has guide grooves 20, for example, so that the lifting device 2 set against transport container 1 as shown in FIG. 4 forms a tongue-and-groove connection 21 with the transport container 1 that extends transversely to the lifting direction H. This enables the transport container 1 to be displaced transversely to the lifting direction H relative to the lifting device 2 by sliding the guide webs 19 with respect to the guide grooves 20.

FIG. 5 shows a transport container 1 in the lifting position, which is picked up by the lifting device 2 and positioned on the infeed side of a container rack 22, and which is detachably connected to a sliding device 3 in a tension-proof and shear-proof manner. The sliding device 3 comprises two sliders 16, each mounted on a lifting arm 7, 8 so as to be displaceable transversely to the lifting direction H. The sliders 16 each have a latching body 17 for engagement in a latching opening 18 of the transport container 1. In addition, the sliding device 3 has an actuator 23 which is accommodated in a lifting arm 7, 8. As indicated in FIGS. 5 and 6, the actuator may be a double chain drive formed by a pair of double pinions 24. A double pinion comprises two pinions 25, 26, each with a different diameter, so that the pinions 25 with a smaller diameter and the pinions 26 with a larger diameter are each associated with a chain 27, 28, so that the chain 27 clearly has a lower running speed than the chain 28. A lever arm 29 is articulated both to the chains 27, 28 and to the slider 16. As a result, a displacement of the slider 16 from a lifting position according to FIG. 5 to a transfer position according to FIG. 6 can be effected via the actuating drive 23, so that the transport container 1 is in a rack insertion position as can be seen in FIG. 6. Furthermore, it can be seen in particular from FIG. 6 that the guide for the transport container 1 can simultaneously also form a guide for the sliders 16 for their displacement transversely to the lifting direction H.

FIGS. 7 and 8 each show a detailed view of a slider 16. If the latching body 17 of the slider is inserted into a latching opening 18 of the transport container 1, the latching body 17 can be moved into a latching position as shown in FIG. 7 to form a releasably tension-resistant and shear-resistant connection. For this purpose, the latching body 17 has, for example, two latching body halves 30 which are displaced relative to one another transversely to the direction of insertion and engage behind the latching opening 18 in a form-fitting manner and/or spread the latching body 17 in the latching opening 18 in a force-fitting manner. The actuating movement is initiated by a hydraulic cylinder 31, for example. FIG. 8 again shows the recessed latching body halves 30, so that the latching body 17 is in an open position and can be guided out of the latching opening 18.

Finally, FIG. 9 shows a further embodiment of an actuator 23. The actuator 23 can comprise a link 32, which has a vertically extending link guide 33 and a horizontally extending, arcuate link guide 34. The slider 16 is drive-connected to a drive unit 36 for the lifting arm 35, which is mounted in the link 32 on a vertical guide, via a lifting arm 35 articulated thereto. In addition, the lever arm 35 has a guide pin, not shown in more detail, which engages in the curved link guide 34. If a rotary movement is now applied to the lifting arm 35 via the drive unit 36, on the one hand the drive unit is displaced along the vertical link guide 33 and the section of the lifting arm 35 having the guide pin is displaced along the arcuate link guide 34. Consequently, the slider 16 is also displaced transversely to the lifting direction H.

The invention claimed is:

1. An apparatus for moving transport containers between a container stack and a container rack, said apparatus comprising:

a lifting device configured to set against one of the transport containers transversely with respect to a lifting direction;

wherein the lifting device comprises a guide displacing the transport container transversely with respect to the lifting direction; and wherein a sliding device that is configured to be connected to the transport container in a detachable, tension-resistant and shear-resistant manner displaces the transport container in the guide between a lifting position and a rack insertion position; and an actuating device actuating a latching connection anchoring the transport container;

wherein the actuating device comprises an actuating slider that is arranged at a free end of a chain drive guided in an actuating direction.

2. The apparatus according to claim 1, wherein the lifting device set against the transport container forms a spring-groove connection with the transport container extending transversely to the lifting direction.

3. The apparatus according to claim 1, wherein the lifting device has two lifting arms configured to be displaced relative to one another.

4. The apparatus according to claim 1, wherein the sliding device has at least one slider having a latching body adjustable between a latching position and an open position, and configured to engage in a latching opening of the transport container.

5. The apparatus according to claim 4, wherein the slider of the sliding device is displaceable between a transfer position in which there is a connection to transport container arranged in the container rack and a lifting position in which the transport container is received in the lifting device.

6. The apparatus according to claim 3, wherein the sliding device comprises two sliders each mounted on a lifting arm so as to be displaceable transversely to the lifting direction.

7. The apparatus according to claim 2, wherein the lifting device has two lifting arms configured to be displaced relative to one another.

8. The apparatus according to claim 2, wherein the sliding device has at least one slider having a latching body adjustable between a latching position and an open position, and configured to engage in a latching opening of the transport container.

9. The apparatus according to claim 3, wherein the sliding device has at least one slider having a latching body adjustable between a latching position and an open position, and configured to engage in a latching opening of the transport container.

10. The apparatus according to claim 4, wherein the sliding device comprises two sliders each mounted on a lifting arm so as to be displaceable transversely to the lifting direction.

11. The apparatus according to claim 5, wherein the sliding device comprises two sliders each mounted on a lifting arm so as to be displaceable transversely to the lifting direction.

12. The apparatus according to claim 8, wherein the sliding device comprises two sliders each mounted on a lifting arm so as to be displaceable transversely to the lifting direction.

* * * * *